United States Patent [19]
Levosinski

[11] Patent Number: 5,681,056
[45] Date of Patent: Oct. 28, 1997

[54] FLOW DIRECTOR FOR AIR BAG INFLATOR

[75] Inventor: George J. Levosinski, China, Mich.

[73] Assignee: TRW Vehicle Safety Systems Inc., Lyndhurst, Ohio

[21] Appl. No.: 557,434

[22] Filed: Nov. 14, 1995

[51] Int. Cl.⁶ .................................................. B60R 21/28
[52] U.S. Cl. ................................... 280/742; 280/736
[58] Field of Search .................................. 280/742, 736, 280/740, 737, 741; 102/272, 273, 530, 531

[56] References Cited

U.S. PATENT DOCUMENTS

| 4,005,876 | 2/1977 | Jorgensen et al. | 288/741 |
| 4,158,696 | 6/1979 | Wilhelm | 422/166 |
| 4,817,828 | 4/1989 | Goetz | 222/3 |
| 4,878,690 | 11/1989 | Cunningham | 280/741 |
| 5,248,162 | 9/1993 | Levosinski et al. | 280/740 |
| 5,397,544 | 3/1995 | Kobari et al. | 422/167 |
| 5,478,109 | 12/1995 | Faigle et al. | 280/736 |

Primary Examiner—Brian L. Johnson
Assistant Examiner—Jonathan E. Butts
Attorney, Agent, or Firm—Tarolli, Sundheim, Covell, Tummino & Szabo

[57] ABSTRACT

An apparatus (10) for inflating an inflatable vehicle occupant protection device (12) includes a tubular body (30). Fluid may flow through a plurality of discharge openings (54) in the tubular body (30). An ignitable material (64) is located within the tubular body (30) for producing, when ignited, combustion products including gas for inflating the protective device (12). A filter (70) is located within the tubular body (30) and around the ignitable material (64). A plenum chamber (100) is located between the filter (70) and the tubular body (30) for combustion products to enter after flowing from the filter. A flow directing member (80) is attached to the filter (70) and is located in the plenum chamber (100). The flow directing member (80) is spaced from the tubular body (30) and positioned to block combustion products from flowing radially outward from the filter (70) directly to the plurality of discharge openings (54) and to direct combustion products to flow around edges (82, 85, 86) of the flow directing member.

6 Claims, 4 Drawing Sheets

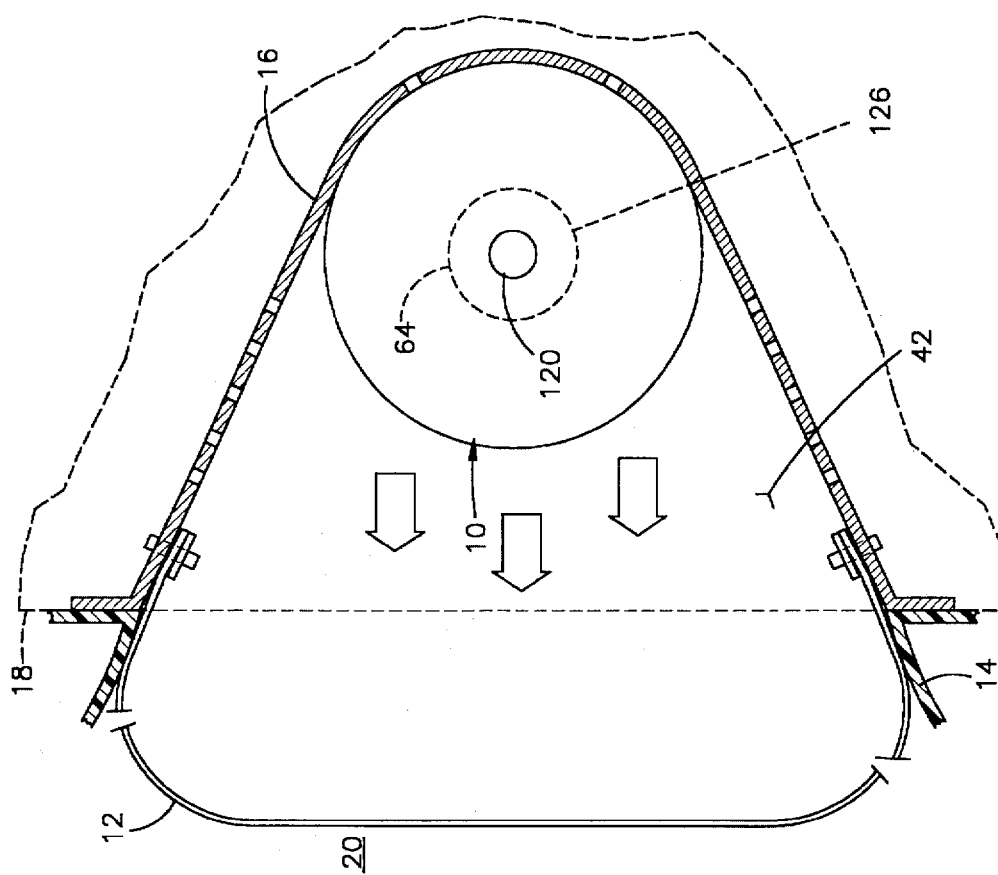
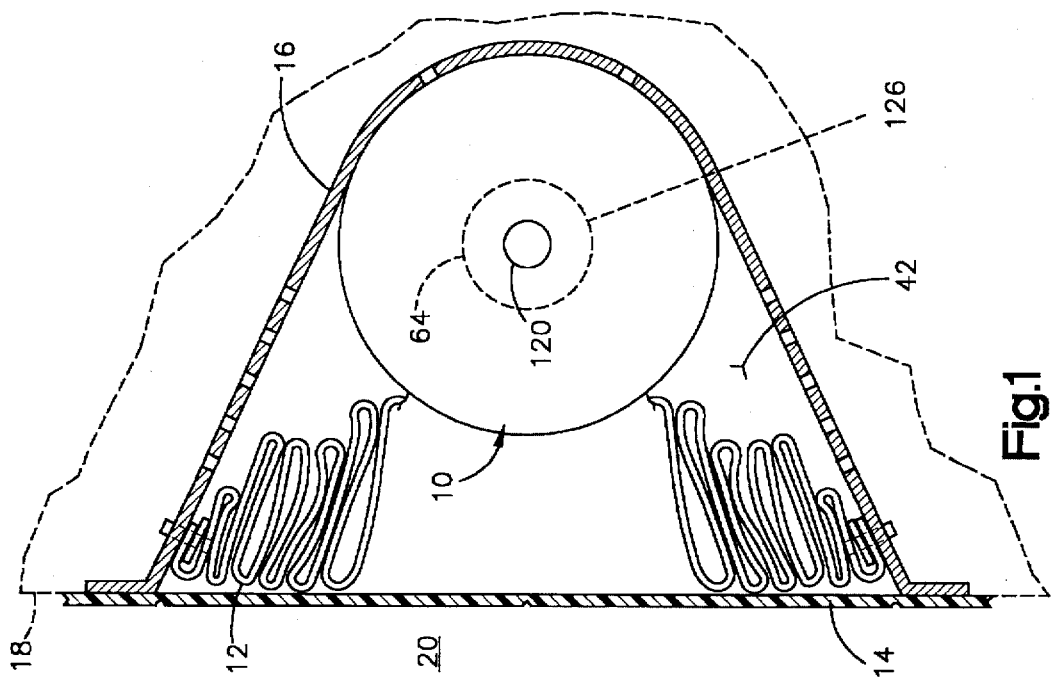

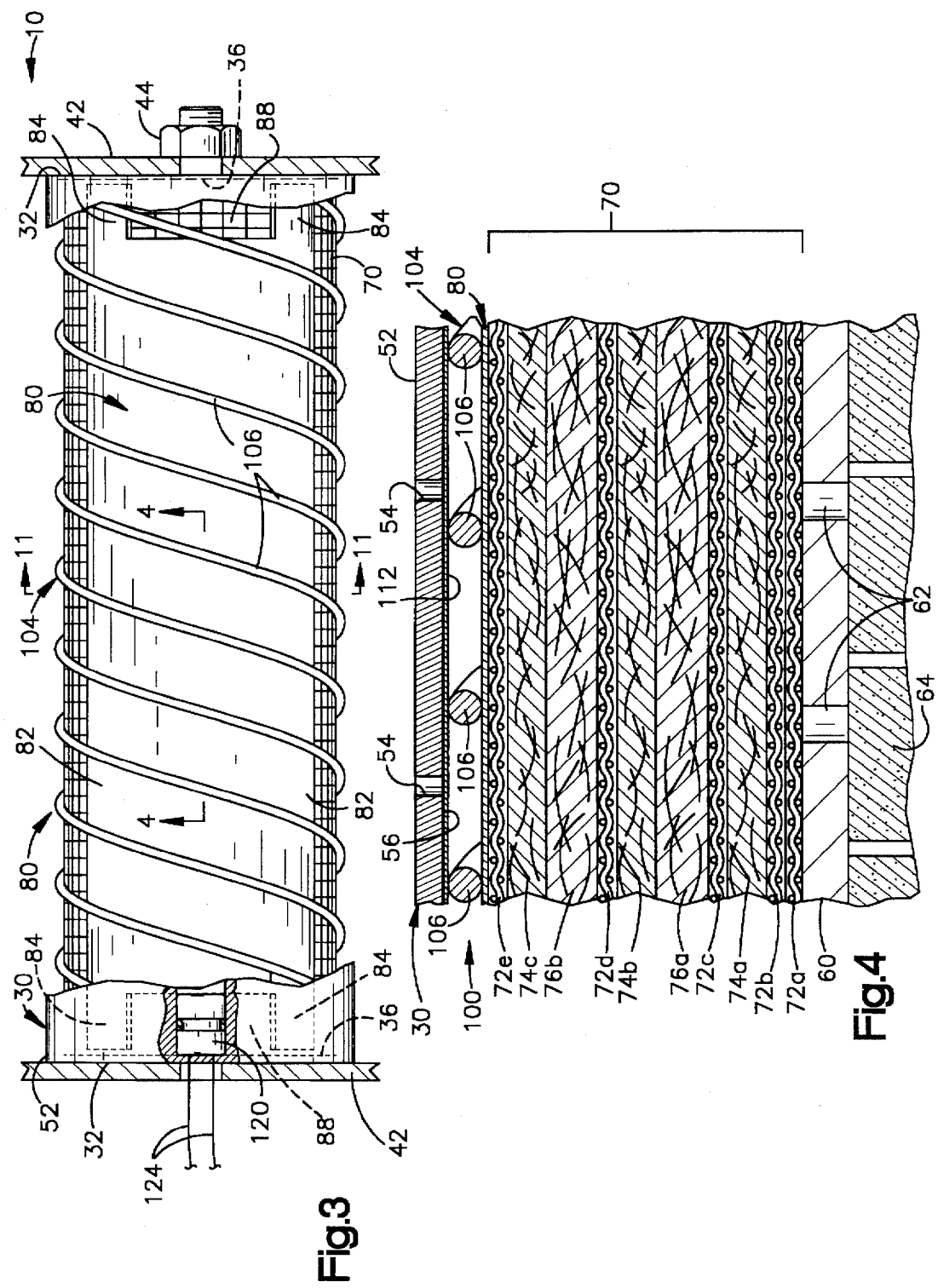

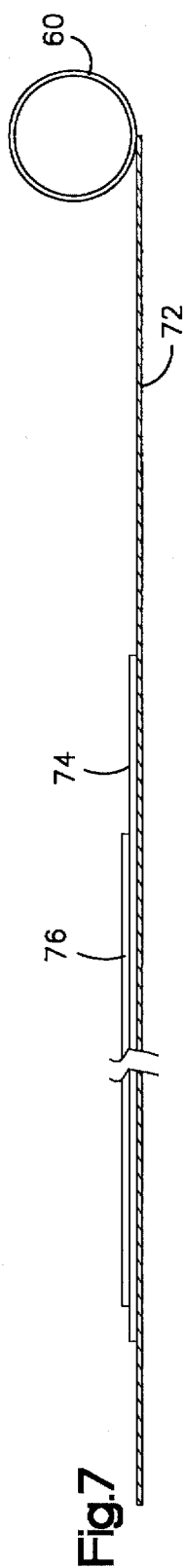
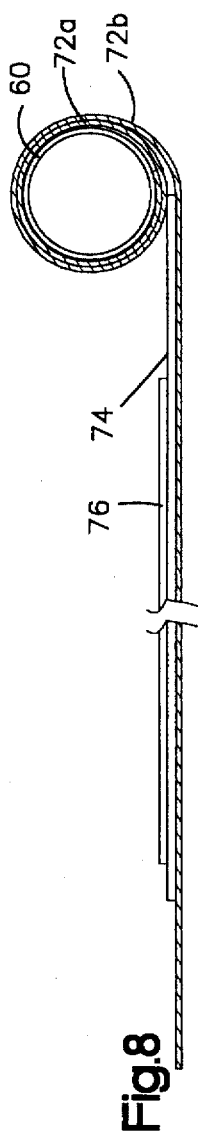
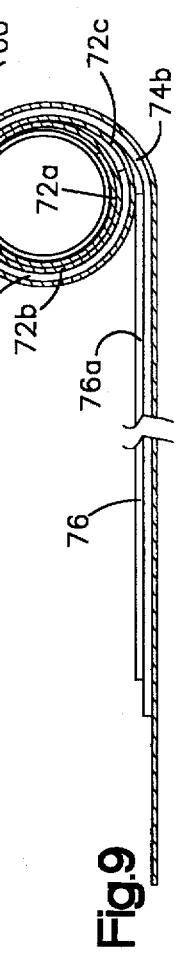
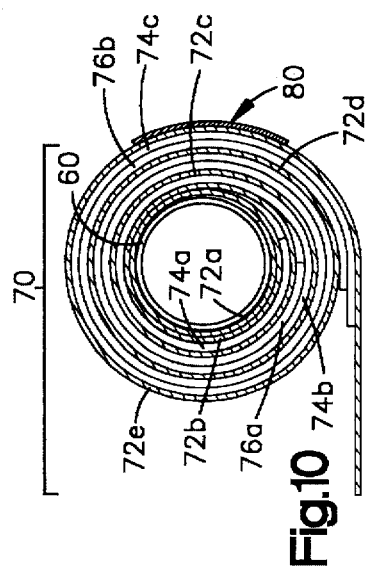
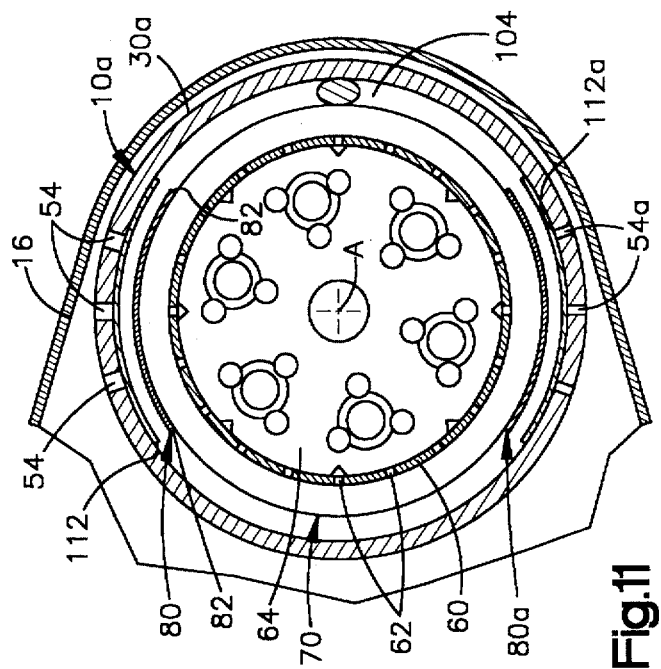

FLOW DIRECTOR FOR AIR BAG INFLATOR

BACKGROUND OF THE INVENTION

1. Technical Field

The present invention relates to an apparatus for inflating an inflatable vehicle occupant restraint or protection device, such as an air bag.

2. Description of the Prior Art

A known air bag is inflated to restrain or protect a vehicle occupant in response to a vehicle collision or other situation which requires inflation of the air bag. The air bag is inflated by inflation fluid provided in the form of gas by one type of inflator. The inflator includes an ignitable material which, when ignited, generates combustion products including heat, pressure, hot gas, hot particles, and particulates. It is desirable to prevent hot gas, hot particles, and particulates from entering and contacting the air bag.

SUMMARY OF THE INVENTION

The present invention is directed to an inflator for inflating an inflatable vehicle occupant restraint or protection device, such as an air bag. The inflator includes a container having a tubular body. Ignitable material is located within the container. The ignitable material produces, upon ignition, combustion products including pressurized gas for inflating the vehicle occupant restraint. The tubular body of the container includes a plurality of discharge openings through which combustion products can flow to inflate the air bag. A filter is disposed within the tubular body and around the ignitable material to filter and cool combustion products. A flow directing member is disposed between the filter and the tubular body. The flow directing member is spaced radially inward of the discharge openings to block combustion products flowing through the filter from flowing directly to the plurality of discharge openings and to force combustion products flow around edges of the flow directing member.

The flow directing member further cools combustion products. Particulates and hot particles carried by the gas flowing out of the filter may adhere to the flow directing member.

A plenum chamber is located between the filter and the tubular body. The plenum chamber is defined by structure radially spacing the filter from the tubular body. The flow directing member is located in the plenum chamber. The flow directing member is attached to the filter. The flow directing member has notches at either end for combustion products to flow through to the discharge openings. A rupturable foil is disposed along the tubular body to block flow of gas through the discharge openings prior to rupturing. The foil ruptures when pressure within the plenum chamber increases to a first predetermined pressure.

A plurality of secondary discharge openings may be provided in the tubular body at a location diametrically opposite the plurality of discharge openings. A second flow directing member is disposed between the filter and tubular body. The second flow directing member is spaced radially inward of the plurality of secondary discharge openings to block combustion products flowing through the filter from flowing directly to the plurality of secondary discharge openings and to force combustion products flow around edges of the second flow directly member.

Each of the plurality of discharge openings has uniform flow area which is different than the flow area of each of the plurality of secondary discharge openings. A rupturable second foil is disposed along the surface of the tubular body closing the plurality of secondary discharge openings. The second foil ruptures when pressure in the plenum chamber increases to a second predetermined pressure which is different than the first predetermined pressure.

BRIEF DESCRIPTION OF THE DRAWINGS

Further features and advantages of the present invention will become apparent to one skilled in the art to which the present invention relates upon reading the following description with reference to the accompanying drawings, in which:

FIG. 1 is a schematic partial sectional view of a vehicle occupant safety apparatus including an inflatable air bag and an inflator embodying the present invention;

FIG. 2 is a view of the apparatus of FIG. 1 illustrating inflation of the air bag;

FIG. 3 is a view of the inflator of FIG. 1 with parts removed for clarity;

FIG. 4 is a sectional view of a portion of the inflator of FIG. 3, taken approximately along line 4—4 in FIG. 3;

FIGS. 7-10 are sequential schematic illustrations of a method of making a part of the inflator of FIG. 3; and FIG. 11 is a sectional view of the inflator of FIG. 3, taken approximately along line 11—11 in FIG. 3, illustrating a modified embodiment of the present invention.

DESCRIPTION OF PREFERRED EMBODIMENTS

Figure 5:
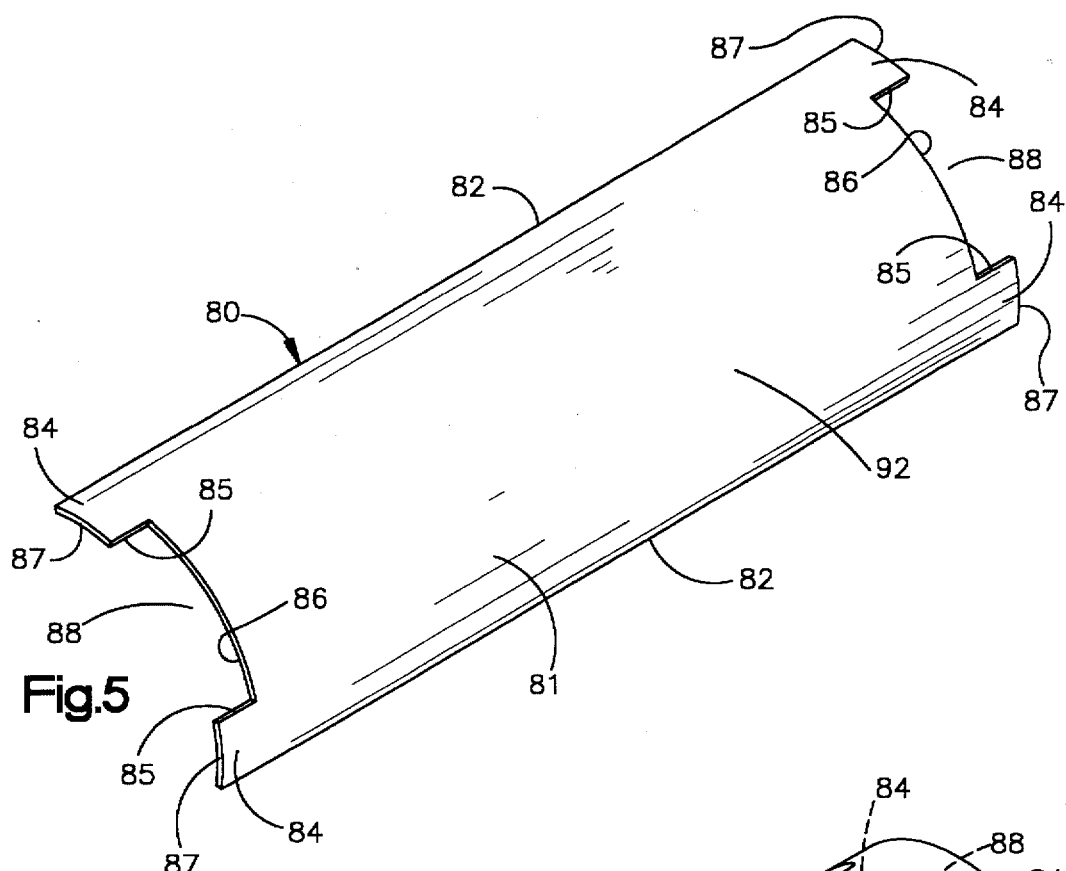
FIG. 5 is a perspective view of a part of the inflator of FIG. 3.

An actuatable inflator 10 (FIGS. 1-3 and 6) provides inflation fluid to inflate an inflatable vehicle occupant restraint or protective device, such as an air bag 12. Upon inflation, the air bag 12 restrains and protects an occupant of a vehicle during a situation of the vehicle, such as a collision, which requires inflation of the air bag. The inflator 10 and the air bag 12 are housed in a reaction canister 16. The reaction canister 16, as illustrated in FIGS. 1 and 2, is mounted in an instrument panel 18 of the vehicle. A cover 14 is provided to hide the air bag 12 and the reaction canister 16 in the instrument panel 18.

When the vehicle experiences the situation which requires inflation of the air bag 12, the inflator 10 is actuated to inflate the air bag. The air bag 12 expands from a folded and stored condition, as illustrated in FIG. 1, to an inflated condition, as illustrated in FIG. 2. During inflation, the air bag 12 forces the cover 14 to tear and open. The inflated air bag 12 extends from the reaction canister 16 in the instrument panel 18, through an opening in the torn cover 14, and into an occupant compartment 20. The inflated air bag 12 restrains and cushions movement of an occupant in the compartment 20 in a direction toward the instrument panel 18 and protects the occupant from forcefully striking parts of the vehicle, such as the instrument panel or windshield.

The inflator 10 (FIG. 3) includes a tubular metal body 30. The inflator 10 also includes a pair of end walls 32. Each end wall 32 is fixed to an opposite end of the tubular body 30 to define a container. The end walls 32 have inner side surfaces 36. The inflator 10 is fixed to at least one of a pair of opposite side walls 42 of the reaction canister 16 by a fastener 44.

Figure 6:
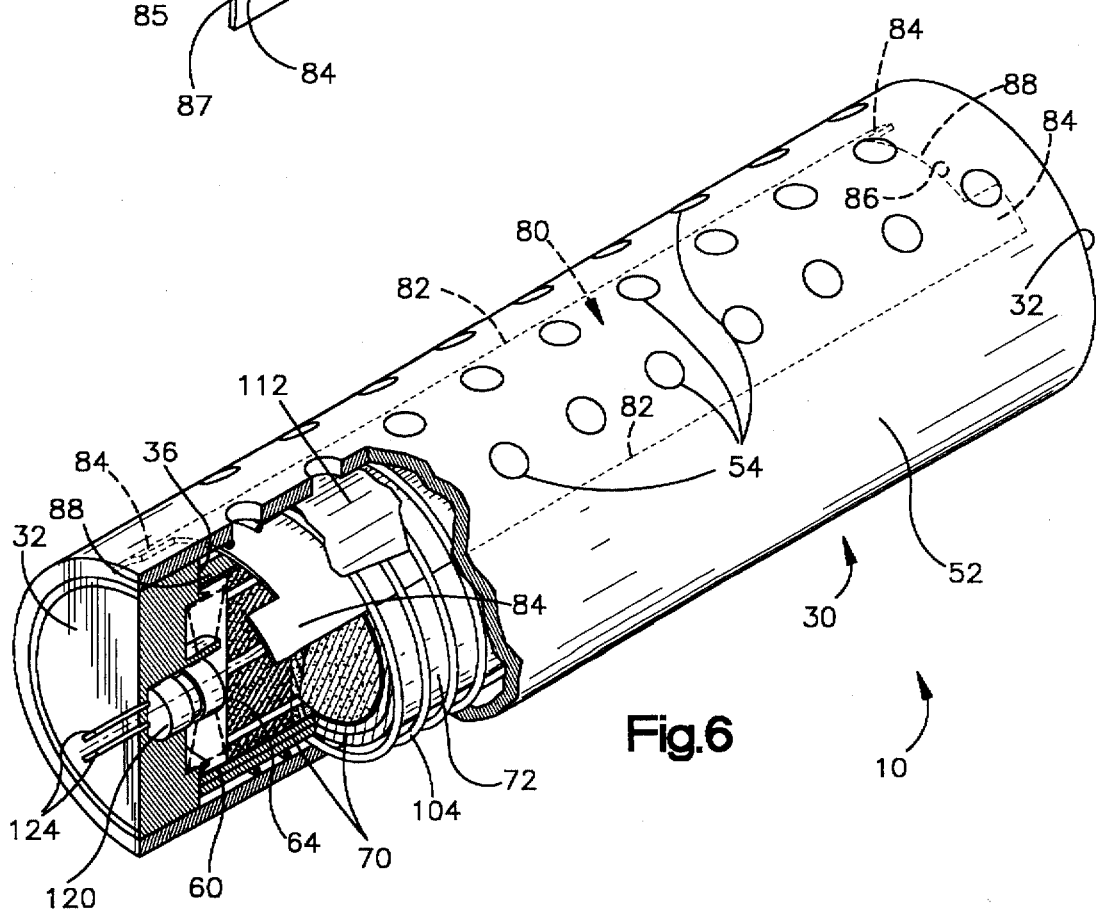
FIG. 6 is a perspective view of the inflator of FIG. 3 with parts broken away for clarity.

The tubular body 30 of the inflator 10 includes an outer surface 52 and an inner surface 56 (FIG. 4). A plurality of primary discharge openings 54 (FIGS. 4 and 6) extend radially through the tubular body 30 between the outer surface 52 and the inner surface 56. The discharge openings 54 are preferably arranged in three parallel rows extending longitudinally along an arcuate portion of the tubular body 30, as illustrated in FIGS. 6 and 11. It will be apparent that the plurality of discharge openings 54 can be of any suitable shape, size or arrangement in the tubular body 30.

The inflator 10 also includes an axially extending perforated tube 60 located coaxially within the tubular body 30. The perforated tube 60 is spaced radially inward from the inner surface 56 of the tubular body 30. A plurality of openings 62 are arranged around the circumference and along the length of the perforated tube 60.

An ignitable pyrotechnic material 64 is located within the perforated tube 60. The ignitable pyrotechnic material 64 is preferably provided in the form of a plurality of axially arranged individual grains or disks, as is known. The ignitable pyrotechnic material 64, when ignited, generates combustion products including pressurized gas for inflating the air bag 12, heat, hot particles, and particulates. The combustion products flow radially outward from the openings 62 in the perforated tube 60 toward the inner surface 56 of the tubular body 30.

A filter assembly 70 (FIGS. 4 and 6–10) is located between the tubular body 30 and the perforated tube 60 housing the ignitable material 64. Preferably the filter assembly 70 is tubular and formed directly on the outer surface of the perforated tube 60. The filter assembly 70 is made of wrapped layers of steel wire mesh screen 72 (FIG. 6), steel wool 74, and glass wool 76.

To produce the filter assembly 70, a sheet of steel wool 74 is placed on a sheet of wire mesh screen 72, as illustrated in FIG. 7. A sheet of glass wool 76 is placed on the sheet of steel wool 74. The perforated tube 60 is placed at one end of the wire mesh screen 72. As illustrated in FIGS. 8–10, the wire mesh screen 72, steel wool 74 and glass wool 76 are then wrapped around the outer surface of the perforated tube 60.

As illustrated in FIG. 8, a first layer of wire mesh screen 72a is wrapped onto the perforated tube 60. A second layer of the wire mesh screen 72b (FIG. 4) is then wrapped over the first layer of the wire mesh screen 72a. A first layer of steel wool 74a is wrapped over the second layer of wire mesh screen 72b, as illustrated in FIG. 9. As also illustrated in FIG. 9, a first layer of glass wool 76a is starting to be wrapped over a third layer of wire mesh screen 72c which is wrapped over the first layer of steel wool 74a.

Continued rotation of the perforated tube 60 forms a second layer of glass wool 76b over a third layer of steel wool 74c and a fourth layer of wire mesh screen 72d, as illustrated in FIG. 10. Further continued rotation of the perforated tube 60 forms a final layer of wire mesh screen 72e over the third layer of steel wool 74c. The ends of the various layers preferably are staggered circumferentially around the perforated tube 60 so the radial thickness of the filter assembly 70 is substantially uniform. An end of the final layer of wire mesh screen 72e is spot-welded to a portion of the final layer of wire mesh screen to maintain the tubular configuration of the filter assembly 70 prior to placement within the tubular body 30.

A flow directing member 80 (FIG. 3) is located between the filter assembly 70 and the tubular body 30. The flow directing member 80 is preferably attached to the outer surface of the filter assembly 70 in a suitable manner, such as by an adhesive or a weld. The tubular filter assembly 70 with the flow directing member 80 attached is inserted into the tubular body 30 as a unit during assembly of the inflator 10.

The flow directing member 80 is spaced radially inward from the inner surface 56 of the tubular body 30. The flow directing member 80 comprises a substantially impermeable and unrupturable body portion 81 (FIG. 5). The body portion 81 is aligned with the plurality of discharge openings 54 by being located radially inward of an arcuate portion of the tubular body 30 in which the plurality of discharge openings are located. The body portion 81 extends in an arc which is equal to or greater than the arc spanned by the plurality of discharge openings 54, as illustrated in FIG. 11. Preferably the Body portion 81 extends over an arcuate length in the range of about 60° to about 90° relative to the longitudinal central axis A of the tubular body 30.

The flow directing member 80 comprises a piece of rectangular metal formed into an arcuate shape in a plane extending normal to the longitudinal central axis A of the tubular body 30. The flow directing member 80 is made preferably of aluminum, although it may be made of other metal materials, including steel. The thickness of the flow directing member 80, measured radially of the axis A, is about 0.005 inch to about 0.020 inch.

The flow directing member 80 includes parallel side edges 82 on the body portion 81 which extend generally parallel to the longitudinal central axis A of the tubular body 30. The flow directing member 80 includes a pair of tabs 84 which are spaced apart in a circumferential direction at the opposite ends of the body portion 81.

The tabs 84 extend longitudinally from each corner of the body portion 81 of the flow directing member 80. Each of the tabs 84 has a generally rectangular shape, prior to the body portion 81 being formed into an arcuate shape. Parallel inner sides 85 of the tabs 84 and an end surface 86 of the flow directing member 80 define a notch 88 in each end of the body portion 81. Axial ends or edges 87 of the tabs 84 are spaced from the inner side surfaces 36 of the end walls 32 of the inflator 10.

A plenum chamber 100 is located between the filter assembly 70 and the tubular body 30. A strand of wire 104 (FIGS. 3, 4 and 6) is helically wrapped around the filter assembly 70 and the flow directing member 80 to define the plenum chamber 100. The helically wrapped strand of wire 104 assures that the filter assembly 70 and the flow directing member 80 remain spaced radially inward from the inner surface 56 of the tubular body 30. The strand of wire 104 forms a plurality of circumferentially extending turns 106 which are spaced apart axially.

The strand of wire 104 is metal and has a substantially uniform diameter in the range of about 0.028 inch to about 0.059 inch and preferably about 0.047 inch. The strand of wire 104 is preferably made from low carbon steel or stainless steel. The helically extending turns 106 of the strand of wire 104 are spaced apart axially approximately one-half inch to about two and one-half inches, and preferably about one inch. The tension in the strand of wire 104 wrapped around the filter assembly 70 and the flow directing member 80 is preferably low enough so that the strand of wire 104 is not embedded in, or does not compress, the outer surfaces of the flow directing member and the filter assembly.

The ends of the strand of wire 104 are welded to the outer layer of wire screen 78 at a location spaced circumferentially from the flow directing member 80. The plenum chamber 100 permits combustion products to flow in a circumferential direction and an axial direction along the inner surface 56 of the tubular body 30 before reaching the discharge openings 54 in the tubular body. The combustion products thus have a greater chance of contacting the filter assembly 70, the strand of wire 104 and the tubular body 30 to cool and plate out solid portions of the combustion products.

It will be apparent that a plenum chamber 100 may be defined by structure other than the strand of wire 104 having a circular cross-section. For example, a strand of wire having a rectangular cross-section rather than a circular cross-section could be used in place of the strand of wire 104. Any other structure which defines a radial gap between the filter assembly 70 and the inner surface 56 of the tubular body 30 would be suitable. The other structure should provide a smooth surface for contacting the flow directing member 80 and filter assembly 70. The other structure should have a relatively uniform thickness so the plenum member 100 has a substantially uniform radial thickness along its entire length to space apart the inner surface 56 of the tubular body 30 and the filter assembly 70.

The body portion 81 of the flow directing number 80 blocks the radial flow of combustion products directly from the filter assembly 70 to the plurality of discharge openings 54 in the tubular body 30 of the inflator 10. The arcuate extent or length of the body portion 81 is sufficient to force some combustion products produced by ignition of the ignitable pyrotechnic material 64 to flow in circuitous axial and/or circumferential directions from the filter assembly 70 before reaching the plurality of discharge openings 54. The circuitous flow path increases the exposure of some combustion products to the filter assembly 70 and to the inner surface 56 of the tubular body 30 to plate out non-gas combustion products and further cool combustion products. Some combustion products redirected by the flow directing member 80 are forced to flow around the parallel edges 82, end surfaces 86, and the ends 87 of the tabs 84 of the body portion 81 into the plenum chamber 100. The notches 88 at the opposite ends of the body portion 81 of the flow directing member 80 and an approximately 270° to 300° arc between the parallel edges 82 of the flow directing member allow most combustion products to flow radially outward from the filter assembly 70 directly into the plenum chamber 100. Combustion products then flow from the plenum chamber 100 to the plurality of discharge openings 54 in the tubular body 30 of the inflator 10.

A thin layer of rupturable film or foil 112 is attached to a portion of the inner surface 56 of the tubular body 30. The foil 112 has a radial thickness of about 0.003 inch, which is less than the radial thickness of the body portion 81. The foil 112 blocks the plurality of discharge openings 54 in the tubular body 30 prior to ignition of the ignitable pyrotechnic material 64. The foil 112 seals the interior of the inflator 10 form environmental conditions, such as moisture, to prevent the environmental conditions from adversely affecting the ignitable pyrotechnic material 64 and the filter assembly 70. Upon ignition of the ignitable pyrotechnic material 64, the foil 112 ruptures from the pressure of the combustion products in the plenum chamber 100 in the inflator 10 increasing to a predetermined pressure. Combustion products are then free to flow through the plurality of discharge openings 54.

An actuatable igniter 120 (FIG. 3) initiates the ignition and combustion of the ignitable pyrotechnic material 64. The igniter 120 contains an ignitable booster material, such as $BKNO_3$. A pair of leads 124 are connected to a vehicle collision sensor (not shown). When a collision occurs which requires inflation of the air bag 12, a switch in the sensor closes and electrical energy signal is communicated to the igniter 120 through the leads 124. When actuated by electrical energy, a bridgewire (not shown) heats to effect ignition of the booster material in the igniter 120. The booster material in the igniter 120, when ignited, produces heat, flame and hot particles which ignite the ignitable pyrotechnic material 64 in the perforated tube 60 to produce combustion products for inflating the air bag 12.

In operation, when the vehicle in which the inflator 10 (FIG. 1) is mounted experiences sudden deceleration, such as occurs in a collision requiring inflation of the air bag 12, the switch in the collision sensor completes an electrical circuit (not shown) to send electrical energy to actuate the igniter 120 over the leads 124. Actuation of the igniter 120 causes the ignitable pyrotechnic material 64 (FIG. 4) in the perforated tube 60 to ignite. The ignitable pyrotechnic material 64 produces combustion products including pressurized gas, particulates, hot particles and heat which flow radially out of the perforated tube 60 through the plurality of openings 62. Combustion products then flow into and radially through the tubular filter assembly 70. Hot particles and particulates are removed from the flow of combustion products by the filter assembly 70. Combustion products are also cooled by the filter assembly 70.

Most combustion products flow from the filter assembly 70 directly into the plenum chamber 100. Some combustion products flow radially outward from the filter assembly 70 in a direction toward the flow directing member 80. The flow directing member 80 forces some combustion products from the filter assembly 70 to flow around the edges 82, 85, 86, 87 of the flow directing member. Combustion products flow into the plenum chamber 100. The flow of combustion products in the plenum chamber 100 can be axial and/or circumferential relative to the tubular body 30.

Many of the remaining hot particles and particulates in the flow of combustion products plate out onto the flow directing member 80, the strand of wire 104 and the inner surface 56 of the tubular body 30. The flow directing member 80, the strand of wire 104 and inner surface 56 of the tubular body 30 also cool the gas and the solids in the flow of combustion products. The momentum of many of the particulates and hot particles causes them to leave the flow of gas as the combustion products flow around the edges 82, 86 of the flow directing member 80 and through the plenum chamber 100.

The pressure of the combustion products acts on the rupturable foil 112 and, upon reaching a predetermined pressure, ruptures the foil 112 extending across the plurality discharge openings 54. Filtered and cooled combustion products, which is primarily gas at this time, then exit the inflator 10 radially outward through the plurality of discharge openings 54. The cooled gas flows from the inflator 10 into the reaction canister 16 to inflate the air bag 12, as illustrated in FIG. 2.

An inflator 10a constructed according to a modified version of the present invention is illustrated in FIG. 11. The inflator 10a is similar in construction and operation to the inflator 10, illustrated in FIGS. 1–6 and described above. The modified or added components of the inflator 10a are designated with a suffix "a" associated with reference numerals. Otherwise, components without the suffix "a" are unmodified and were present in the unmodified version of the present invention illustrated in FIGS. 1–6.

The inflator 10a includes a tubular body 30a having plurality of secondary discharge openings 54a formed in the tubular body diametrically opposite the plurality of primary discharge openings 54. Each of the secondary discharge openings 54a has flow area or diameter which is smaller than that of each individual primary discharge opening 54.

The secondary discharge openings 54a are blocked by a second thin layer of rupturable foil 112a. Due to the difference in flow area between the plurality of primary discharge openings 54 and the plurality of secondary discharge openings 54a, the second foil 112a ruptures at a second predetermined pressure which is greater than the predetermined pressure required to rupture the foil 112 extending over the plurality of primary discharge openings 54. This rupture pressure difference results because the foil 112a spans a smaller flow area or diameter which is unsupported than the foil 112 which spans the primary discharge openings 54.

Thus when the inflator 10a of the alternate embodiment is actuated and pressure of the combustion products increases to the second predetermined pressure sufficient to burst the foil 112a extending across the plurality of secondary discharge openings 54a, a second flow path is created for inflation gas to exit the inflator 10a. The plurality of secondary discharge openings 54a ensures a relatively uniform rate of inflation of the air bag 12 over a variety of ambient temperatures to which a vehicle having the inflator 10a is exposed. It will be apparent that, under some conditions, the second foil 112a may not rupture because pressure within the inflator 10a does not reach the second predetermined pressure.

A second flow directing member 80a is fixed to the filter assembly 70 and is located in the plenum chamber 100. The second flow directing member 80a is located on a filter assembly 70 diametrically opposite the flow directing member 80. The second flow directing member 80a has an identical structure and function to the flow directing member 80. However, it will be apparent that the second flow directing member 80a could have a smaller arcuate extent or length than the flow directing member 80 because it covers the smaller secondary discharge openings 54a.

The second flow directing member 80a, when assembled in the tubular body 30, is located such that it blocks direct radial flow of combustion products through the plurality of secondary discharge openings 54a in the tubular body 30 and forces the combustion products to flow around edges of the second flow directing member. The second flow directing member 80a cools combustion products and plates out hot particles and particulates.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protective device, said apparatus comprising:

a tubular body centered on a longitudinal axis and having a plurality of discharge openings through which fluid can flow to inflate the protective device;

an ignitable material within said tubular body for producing, when ignited, combustion products including gas for inflating the protective device;

a filter disposed within said tubular body and around said ignitable material;

a plenum chamber located between said filter and said tubular body for combustion products to enter after flowing from said filter; and a flow directing member located in said plenum chamber and spaced from said tubular body, said flow directing member comprising an arcuate gas impervious member which extends over an arcuate length of about 60° to 90° around said longitudinal axis of said tubular body, said arcuate gas impervious member being defined by parallel longitudinally extending sides which extend over said arcuate length of about 60° to 90°;

said gas impervious member having an outer boundary which includes a pair of opposite parallel longitudinally extending side edges and a pair of end edges which interconnect said side edges, each of said end edges having a notch therein through which gas flows, each of said notches being defined in part by a pair of spaced apart protruding portions of said gas impervious member;

said gas impervious member being positioned to block combustion products from flowing radially outward from said filter directly to said plurality of discharge openings and being spaced from said tubular body to force combustion products to flow around said longitudinally extending side edges and said end edges and through said notches in said gas impervious member.

2. The apparatus as defined in claim 1 wherein said flow directing member is attached to said filter.

3. The apparatus as defined in claim 1 further including a rupturable foil disposed along a surface of said tubular body closing said plurality of discharge openings until pressure in said plenum chamber increases to a predetermined pressure to rupture said foil.

4. The apparatus as defined in claim 1 wherein said plenum chamber is defined by a wire member helically wound around said filter to space said filter radially from said tubular body.

5. The apparatus as defined in claim 1 having a second plurality of discharge openings in said tubular body located diametrically opposite said plurality of discharge openings and a second flow directing member located in the plenum chamber spaced from said tubular body to block combustion products flowing radially outward from said filter directly to said second plurality of discharge openings and to force combustion products to flow around said longitudinal side edges and said end edges of said second flow directing member to said second plurality of discharge openings.

6. The apparatus as defined in claim 5 further including rupturable first foil disposed along a surface of said tubular body closing said plurality of discharge openings, said first foil rupturing upon pressure in said plenum chamber increasing to a first predetermined pressure, each of said plurality of discharge openings having a uniform flow area which is different than the flow area of each of said second plurality of discharge openings, and further including a rupturable second foil disposed along said surface of said tubular body closing said second plurality of discharge openings, said second foil rupturing upon pressure in said plenum chamber increasing to a second predetermined pressure different than said first predetermined pressure.

* * * * *